(12) United States Patent
Suzuki et al.

(10) Patent No.: US 11,508,494 B2
(45) Date of Patent: *Nov. 22, 2022

(54) DIELECTRIC COMPOSITION AND ELECTRONIC COMPONENT

(71) Applicant: TDK Corporation, Tokyo (JP)

(72) Inventors: Shota Suzuki, Tokyo (JP); Nobuyuki Okuzawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 358 days.

This patent is subject to a terminal disclaimer.

(21) Appl. No.: 16/818,413

(22) Filed: Mar. 13, 2020

(65) Prior Publication Data

US 2020/0294687 A1  Sep. 17, 2020

(30) Foreign Application Priority Data

Mar. 15, 2019 (JP) .............................. JP2019-048913
Mar. 15, 2019 (JP) .............................. JP2019-048915
Jan. 30, 2020 (JP) .............................. JP2020-013499

(51) Int. Cl.
*H01B 3/10* (2006.01)
*H01P 7/10* (2006.01)

(52) U.S. Cl.
CPC ................. *H01B 3/10* (2013.01); *H01P 7/10* (2013.01)

(58) Field of Classification Search
CPC ............................... H01B 3/10; C04B 35/495
See application file for complete search history.

(56) References Cited

U.S. PATENT DOCUMENTS

2007/0094871 A1  5/2007  Moon et al.
2009/0155624 A1  6/2009  Dudesek et al.

FOREIGN PATENT DOCUMENTS

| JP | H04-285046 A | | 10/1992 |
| JP | 2004-241146 | * | 8/2004 |
| JP | 2009-537444 A | | 10/2009 |
| KR | 100714580 B1 | | 5/2007 |
| WO | WO 2008/109564 | * | 9/2008 |

* cited by examiner

*Primary Examiner* — Chau N Nguyen
(74) *Attorney, Agent, or Firm* — Oliff PLC

(57) ABSTRACT

A dielectric composition contains a complex oxide represented by a composition formula of $Bi_xZn_yNb_zO_{1.75+\delta}$. $x+y+z=1.00$. $x<0.20$. $0.20 \leq y \leq 0.50$. $0.25 \leq x/z$. A dielectric composition contains a complex oxide represented by a composition formula of $Bi_xZn_yNb_zO_{1.75+\delta}$. $x+y+z=1.00$. $0.20 \leq y \leq 0.50$. $1.5 < x/z \leq 3.0$. $z<0.25$.

6 Claims, 1 Drawing Sheet

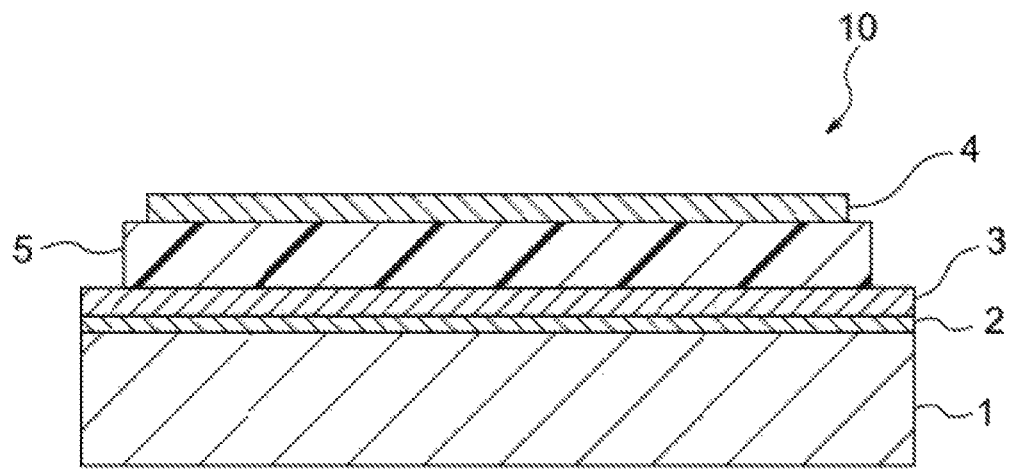

DIELECTRIC COMPOSITION AND ELECTRONIC COMPONENT

BACKGROUND OF THE INVENTION

The present invention relates to a dielectric composition and an electronic component.

There is a high demand for higher performance of mobile communication devices represented by smartphones. For example, the number of frequency bands to be used is increasing for achieving high-speed large-capacity communication. The frequency band to be used is a high frequency band (e.g., GHz band). Among high frequency components that function in such a high frequency band (e.g., baluns, couplers, filters, duplexers combining filters, diplexers combining filters), there is one utilizing a dielectric material as a resonator. Such a dielectric material is demanded to have a small dielectric loss and selectively pass a specific frequency in high frequency band.

The mobile communication devices are exposed to temperature change due to usage environment, heat generation of parts used in the devices, etc. Meanwhile, capacitance of high frequency components changes depending on temperature, and temperature dependency of capacitance, that is, temperature coefficient of capacitance thereby needs to be small within a predetermined temperature range in high frequency components.

Thus, dielectric materials applicable to the high frequency components are required to have small dielectric loss and temperature coefficient of capacitance. The reciprocal of dielectric loss can be represented as a quality factor (Q factor). In other words, thereby desired is a dielectric material having a high quality factor (Q factor) in high frequency band and a small temperature coefficient of capacitance in a predetermined temperature range.

To correspond with analysis of vehicle information and vehicle travel information, autonomous driving, etc., connected cars with always-on internet connection are being developed. An in-vehicle communication equipment mounted on the connected cars is also a type of the mobile communication devices and is required to be communicable at high speed with large capacity. The in-vehicle communication equipment may be disposed in engine room or its surroundings, which become high temperature, and is thereby particularly required to be reliable at high temperature. Thus, the high frequency components to be mounted on in-vehicle communication equipment are also required to be reliable at high temperature.

In accordance with higher performance of the mobile communication devices and the in-vehicle communication equipment, the number of electronic components mounted on one communication device tends to increase, and the electronic components are simultaneously required to be downsized for maintaining the size of the communication devices. Electrode area needs to be small for downsizing the high frequency components utilizing the dielectric materials. To compensate for the consequent decrease in capacitance, the dielectric materials are required to have a high relative permittivity in high frequency band.

By the way, capacitance of the high frequency components utilizing the dielectric materials changes depending on relative permittivity of the dielectric materials, electrode area, and distance between electrodes. In other words, their changes can adjust capacitance of the high frequency components. Meanwhile, when the performance of the high frequency components utilizing the dielectric materials is changed according to the purpose of communication devices to be mounted and so on, it may be required to correspond with change in performance of the high frequency components by adjusting relative permittivity of the dielectric materials without changing a mounting area of the high frequency components. In this case, it is more preferred that dielectric materials having the same composition system exhibit a relative permittivity corresponding to the performance of the high frequency components than the composition system of the dielectric materials is changed based on a required relative permittivity.

That is, dielectric characteristics required for dielectric materials are diversified for meeting various needs relating to the high frequency components.

Bi—Zn—Nb—O based oxides are conventionally known as materials having predetermined dielectric characteristics in high frequency band. For example, Patent Document 1 discloses a mixture of $Bi_3NbO_7$ phase and $Bi_2(Zn_{2/3}Nb_{4/3})O_7$ phase, and Patent Document 2 discloses a sintered body obtained by mixing $Bi_2O_3$, ZnO, and $Nb_2O_5$ and firing this mixture.

Patent Document 1: JP2009537444 (A)
Patent Document 2: JPH04285046 (A)

BRIEF SUMMARY OF INVENTION

However, Patent Document 1 discloses that an absolute value of temperature coefficient of permittivity of a mixture where $Bi_3NbO_7$ phase and $Bi_2(Zn_{2/3}Nb_{4/3})O_7$ phase are mixed by 1:1 is 10 ppm or less. However, this mixture has a relative permittivity of less than 100, and the dielectric quality factor Q at 1 GHz is about 1000. Thus, the dielectric characteristics in high frequency band are not enough for advancing the downsizing of the high frequency components.

From the viewpoint of not changing the mounting area of the high frequency components, since the permittivity of this mixture is too large, capacitance cannot sufficiently be adjusted even if it is tried to be adjusted by electrode area, thickness of dielectric material, or the like in manufacturing the high frequency components with the same shape, and low capacitance cannot be achieved in the same composition system.

Patent Document 2 discloses that an absolute value of temperature coefficient of permittivity of a sintered body obtained by mixing and firing $Bi_2O_3$, ZnO, and $Nb_2O_5$ at a predetermined proportion is 100 ppm or less. However, this sintered body has a no-load Q factor of 400 or less at 1 GHz, and dielectric characteristics in high frequency band are not thereby enough.

It is a first object of the present invention to provide a dielectric composition having a high quality factor (Q factor) in high frequency band, a small absolute value of temperature coefficient of capacitance Tcc in a predetermined temperature range, a relative permittivity εr within a predetermined range, and a high reliability at high temperature and an electronic component including this dielectric composition.

It is a second object of the present invention to provide a dielectric composition having predetermined values or more of relative permittivity εr and quality factor (Q factor) in high frequency band, a small absolute value of temperature coefficient of capacitance Tcc in a predetermined temperature range, and a high reliability at high temperature and an electronic component including this dielectric composition.

To achieve the first object, the present invention is:

[1] a dielectric composition including a complex oxide containing bismuth, zinc, and niobium, wherein $x+y+z=1.00$,
$x<0.20$,
$0.20 \leq y \leq 0.50$, and
$0.25 \leq x/z$, in which the complex oxide is represented by a composition formula of $Bi_xZn_yNb_zO_{1.75+\delta}$.

To achieve the second object, the present invention is:

[2] a dielectric composition including a complex oxide containing bismuth, zinc, and niobium, wherein $x+y+z=1.00$,
$0.20 \leq y \leq 0.50$,
$1.5 < x/z \leq 3.0$, and
$z<0.25$, in which the complex oxide is represented by a composition formula of $Bi_xZn_yNb_zO_{1.75+\delta}$.

[3] An electronic component including a dielectric layer containing the dielectric composition according to [1] or [2].

Advantageous Effects of Invention

The present invention can provide a dielectric composition having a high quality factor (Q factor) in high frequency band, a small absolute value of temperature coefficient of capacitance Tcc in a predetermined temperature range, a relative permittivity εr within a predetermined range, and a high reliability at high temperature and an electronic component including this dielectric composition.

The present invention can provide a dielectric composition having predetermined values or more of relative permittivity εr and quality factor (Q factor) in high frequency band, a small absolute value of temperature coefficient of capacitance Tcc in a predetermined temperature range, and a high reliability at high temperature and an electronic component including this dielectric composition.

BRIEF DESCRIPTION OF DRAWINGS

FIGURE is a schematic cross-sectional view of a thin film capacitor as an electronic component of the present embodiment.

DETAILED DESCRIPTION OF INVENTION

Hereinafter, the present invention is explained in detail in the following order based on a specific embodiment.
1. Thin Film Capacitor
　1.1. Overall Structure of Thin Film Capacitor
　1.2. Dielectric Film
　　1.2.1. Dielectric Composition
　　1.2.2. First Complex Oxide
　　1.2.3. Second Complex Oxide
　1.3. Substrate
　1.4. Lower Electrode
　1.5. Upper Electrode
2. Method of Manufacturing Thin Film Capacitor
3. Summary of Present Embodiment
4. Modifications 1. Thin Film Capacitor First of all, the electronic component according to the present embodiment is an electronic component used in high frequency band (high-frequency component). As the high-frequency component, explained is a thin film capacitor where a dielectric layer is composed of a thin dielectric film.

(1.1. Overall Structure of Thin Film Capacitor)

As shown in FIGURE, a thin film capacitor 10 as an electronic component according to the present embodiment is structured by laminating a substrate 1, a lower electrode 3, a dielectric film 5, and an upper electrode 4 in this order. A capacitor part is formed from the lower electrode 3, the dielectric film 5, and the upper electrode 4. When the lower electrode 3 and the upper electrode 4 are connected to an external circuit and applied with voltage, the capacitor part exhibits a predetermined capacitance and can function as a capacitor. Each constituent is explained below in detail.

In the present embodiment, a foundation layer 2 is formed between the substrate 1 and the lower electrode 3 for improvement in adhesion between the substrate 1 and the lower electrode 3. The foundation layer 2 is composed of any material that can achieve a sufficient adhesion between the substrate 1 and the lower electrode 3. For example, the foundation layer 2 can be composed of Cr when the lower electrode 3 is composed of Cu, and the foundation layer 2 can be composed of Ti when the lower electrode 3 is composed of Pt.

The thin film capacitor 10 shown in FIGURE may be provided with a protection film for protecting the dielectric film 5 from the outside atmosphere.

Incidentally, the thin film capacitor may have any shape, but normally has a rectangular parallelepiped shape. The thin film capacitor may have any size and has appropriate thickness and length depending on the application.

(1.2. Dielectric Film)

The dielectric film 5 is composed of the following dielectric composition (first dielectric composition or second dielectric composition) according to the present embodiment. In the present embodiment, the dielectric film 5 is preferably a dielectric deposited film having a thin film shape and formed on the substrate by a known film formation method.

The thin film capacitor including the dielectric film 5 composed of the first dielectric composition can exhibit a high Q factor (e.g., 1000 or more) even in a high-frequency band (e.g., 2 GHz) and also exhibit a favorable temperature coefficient of capacitance (e.g., an absolute value of temperature coefficient of capacitance is 50 ppm/° C. or less) and a favorable high temperature accelerated life (e.g., an insulation resistance (IR) at 180° C. is 15.0 h or more). Moreover, this thin film capacitor can exhibit a relative permittivity εr within a predetermined range.

The thin film capacitor including the dielectric film 5 composed of the second dielectric composition can exhibit a high relative permittivity εr (e.g., 100 or more) and a high Q factor (e.g., 1000 or more) even in a high-frequency band (e.g., 2 GHz) and also exhibit a favorable temperature coefficient of capacitance (e.g., an absolute value of temperature coefficient of capacitance is 50 ppm/° C. or less) and a favorable high temperature accelerated life (e.g., an insulation resistance (IR) at 180° C. is 15.0 h or more).

Preferably, the dielectric film 5 has a thickness of 10 nm to 2000 nm (more preferably, 50 nm or more and 1000 nm or less). When the dielectric film 5 is too thin, insulation breakdown of the dielectric film 5 tends to easily occur. If insulation breakdown occurs, the capacitor part cannot function as a capacitor. On the other hand, when the dielectric film 5 is too thick, the electrode area needs to be large for increasing the capacitance of the capacitor, and it may be difficult to downsize the electronic component and reduce its height depending on the architecture of the electronic component.

It is known that Q factor normally tends to decrease as dielectrics become thinner. To obtain a high Q factor, it is necessary to use dielectrics with a certain thickness, that is, bulk dielectrics. However, the dielectric film composed of the dielectric composition according to the present embodiment can obtain a high Q factor even if it has an extremely small thickness as mentioned above.

Incidentally, the thickness of the dielectric film 5 can be measured by processing the thin film capacitor containing the dielectric film 5 with focused ion beam (FIB) processing equipment and observing the obtained cross section with scanning electron microscope (SEM).

(1.2.1. Dielectric Composition)

The dielectric composition according to the present embodiment contains a main component of a complex oxide (Bi—Zn—Nb—O based oxide) containing bismuth (Bi), zinc (Zn), and niobium (Nb). In the present embodiment, the main component is a component accounting for 90 mass % or more of 100 mass % of the dielectric composition.

The complex oxide is represented by a general formula of $A_2B_2O_7$ and contains a pyrochlore phase. In the complex oxide according to the present embodiment, eight oxygen atoms are coordinated to an element occupying the A site (A-site element), and six oxygen atoms are coordinated to an element occupying the B site (B-site element). Then, a $BO_6$ octahedron where the B-site element is located at the center of an octahedron composed of oxygen forms a three-dimensional network that shares the vertices of each other. The A-site element is located in the interstices of this network and is also located at the center of a hexahedron composed of oxygen. If the crystallinity of such a structure is high, this structure is a pyrochlore type crystal structure.

In the present embodiment, the general formula of $A_2B_2O_7$ can be represented by a composition formula of $Bi_xZn_yNb_zO_{1.75+\delta}$. That is, the above-mentioned complex oxide is represented by the composition formula of $Bi_xZn_yNb_zO_{1.75+\delta}$. In this composition formula, x+y+z=1.00.

In the complex oxide, the amount of oxygen (O) may be a stoichiometric ratio or may slightly deviate from the stoichiometric ratio. The amount of deviation from the stoichiometric ratio varies depending on the type of the replacement element and the amount of the replacement and is represented by "$\delta$" in the above-mentioned composition formula.

Thus, "x" is a Bi content ratio of the metal elements in the above-mentioned composition formula of the complex oxide, "y" is a Zn content ratio of the metal elements in the above-mentioned composition formula of the complex oxide, and "z" is a Nb content ratio of the metal elements in the above-mentioned composition formula of the complex oxide.

In the above-mentioned general formula, Bi occupies the A site, and Nb occupies the B site. Meanwhile, Zn can occupy both the A site and the B site in the above-mentioned general formula. Thus, the above-mentioned complex oxide contains a hexahedron in which eight oxygen atoms are coordinated to Zn and an octahedron in which six oxygen atoms are coordinated to Zn, in addition to a hexahedron in which eight oxygen atoms are coordinated to Bi and an octahedron in which six oxygen atoms are coordinated to Nb.

In the present embodiment, the complex oxide having the above-mentioned structural features is explained based on a first complex oxide and a second complex oxide.

(1.2.2. First Complex Oxide)

In the first complex oxide containing Bi, Zn, and Nb, the proportion of polyhedrons in which oxygen is coordinated to Zn affects the stability of the structure. In the present embodiment, "y", which means a Zn content ratio, is 0.20 or more and 0.50 or less. Preferably, "y" is 0.30 or more.

When "y" is in the above range, the first complex oxide has a large proportion of hexahedrons in which eight oxygen atoms are coordinated to Zn and octahedrons in which six oxygen atoms are coordinated to Zn, fewer variations of polyhedral structure in the crystal structure, and less structural change by temperature change. As a result, the capacitance tends to be kept constant even if the temperature changes, and an absolute value of temperature coefficient of capacitance Tcc (|Tcc|) can thereby be within a predetermined range.

When "y" is too small, temperature coefficient of capacitance Tcc tends to deteriorate. This is because the first complex oxide tends to have a large proportion of hexahedrons in which eight oxygen atoms are coordinated to Bi and octahedrons in which six oxygen atoms are coordinated to Nb and a large variation of the polyhedral structure, and the structure thereby tends to easily change. On the other hand, when "y" is too large, relative permittivity $\varepsilon r$ tends to deviate from an appropriate range determined in the present embodiment.

In the first complex oxide, the Bi content ratio ("x") is less than 0.20. "x/z", which means a Bi content ratio ("x") to a Nb content ratio ("z"), is 0.25 or more. When each of "x" and "x/z" is within the above-mentioned range, structural disorder in the B site occurs within an appropriate range, and a favorable quality factor (Q factor) is thereby obtained.

When "x" is within the above-mentioned range, the Nb content is higher than the Bi content in the first complex oxide. The difference in electronegativity between oxygen and Nb is larger than that between oxygen and Bi. This strengthens ionic bond between metal elements and oxygen in the first complex oxide. Thus, oxygen vacancies are hard to occur, and accelerated life at high temperature is improved.

When each of "x", "y", and "z" is within the above-mentioned range in the first complex oxide, quality factor (Q factor), temperature coefficient of capacitance Tcc, and high temperature accelerated life can be favorable, and relative permittivity $\varepsilon r$ is easily within a predetermined range.

(1.2.3. Second Complex Oxide)

In the second complex oxide containing Bi, Zn, and Nb, the proportion of polyhedrons in which oxygen is coordinated to Zn affects the stability of the structure. In the present embodiment, "y", which means a Zn content ratio, is 0.20 or more and 0.50 or less. Preferably, "y" is 0.30 or more.

When "y" is too small, temperature coefficient of capacitance Tcc tends to deteriorate. This is because the second complex oxide tends to have a large proportion of hexahedrons in which eight oxygen atoms are coordinated to Bi and octahedrons in which six oxygen atoms are coordinated to Nb and a large variation of the polyhedral structure, and the structure thereby tends to easily change. On the other hand, when "y" is too large, relative permittivity $\varepsilon r$ tends to deteriorate. This is because the proportion of polyhedrals in which oxygen is coordinated to Zn is too high, and a component that contributes to relative permittivity is small in the second complex oxide.

In the second complex oxide, "x/z", which means a Bi content ratio ("x") to a Nb content ratio ("z"), is larger than 1.50 and 3.00 or less. When each of "x" and "x/z" is within the above-mentioned range, a disorder of atomic arrangement in the A site of the second complex oxide is generated within an appropriate range, and permittivity εr can thereby be favorable due to the disorder while quality factor (Q factor) is favorably maintained.

The second complex oxide has a Nb content ratio ("z") of less than 0.25. When "z" is too large, quality factor (Q factor) tends to deteriorate. Preferably, "z" is 0.15 or more.

When "z" is in the above-mentioned range, the Bi ratio is higher than the Nb ratio in the second complex oxide, and there is a large proportion of hexahedrons in which eight oxygen atoms are coordinated to Bi. As a result, oxygen vacancies are hard to occur, and accelerated life at high temperature is improved.

When each of "x", "y", and "z" is within the above-mentioned range in the second complex oxide, relative permittivity εr, quality factor (Q factor), temperature coefficient of capacitance Tcc, and high temperature accelerated life can be favorable.

Incidentally, the above-mentioned first dielectric composition has a main component of the first complex oxide, and the above-mentioned second dielectric composition has a main component of the second complex oxide. The dielectric compositions (the first dielectric composition and the second dielectric composition) according to the present embodiment may contain trace impurities, sub-components, etc. as long as the effect of the present invention is demonstrated. For example, these elements are Mn, Ca, Ba, etc.

(1.3. Substrate)

The substrate 1 shown in FIGURE may be composed of any material with enough mechanical strength to support the foundation layer 2, the lower electrode 3, the dielectric film 5, and the upper electrode 4 formed on the substrate 1. For example, the substrate 1 is: a single crystal substrate composed of Si single crystal, SiGe single crystal, GaAs single crystal, InP single crystal, $SrTiO_3$ single crystal, MgO single crystal, $LaAlO_3$ single crystal, $ZrO_2$ single crystal, $MgAl_2O_4$ single crystal, or $NdGaO_3$ single crystal; a ceramic polycrystalline substrate composed of $Al_2O_3$ polycrystal, ZnO polycrystal, or $SiO_2$ polycrystal; or a metal substrate composed of metals (e.g., Ni, Cu, Ti, W, Mo, Al, Pt), their alloys, etc. In view of low cost, workability, etc., the substrate of the present embodiment is composed of Si single crystal.

For example, the substrate 1 has a thickness of 10 μm to 5000 μm. When the substrate 1 is too thin, it may be impossible to enhance the mechanical strength. When the substrate 1 is too thick, it may be impossible to contribute to downsizing of the electronic component.

The resistivity of the substrate 1 changes depending on the material of the substrate. When the substrate is composed of a material having a low resistivity, electric current may leak to the substrate during operation of the thin film capacitor and affect electrical characteristics of the thin film capacitor. Thus, when the substrate 1 has a low resistivity, the surface of the substrate 1 is preferably subjected to insulation treatment so as to prevent the inflow of electric current to the substrate 1 during operation.

For example, when the substrate 1 is composed of Si single crystal, an insulation layer is preferably formed on the surface of the substrate 1. As long as the substrate 1 and the capacitor part are insulated sufficiently, there is no limit to the material constituting the insulation layer or the thickness of the insulation layer. In the present embodiment, the material constituting the insulation layer is $SiO_2$, $Al_2O_3$, $Si_3N_x$, etc. Preferably, the insulation layer has a thickness of 0.01 μm or more.

(1.4. Lower Electrode)

As shown in FIGURE, the lower electrode 3 is formed as a thin film via the foundation layer 2 on the substrate 1. The lower electrode 3 is an electrode for sandwiching the dielectric film 5 with the upper electrode 4 mentioned below and functioning as a capacitor. The lower electrode 3 is composed of any conductive material, such as metals of Pt, Ru, Rh, Pd, Ir, Au, Ag, Cu, etc., their alloys, and conductive oxides.

The lower electrode 3 has any thickness as long as it functions as an electrode. In the present embodiment, the lower electrode 3 preferably has a thickness of 0.01 μm or more.

(1.5. Upper Electrode)

As shown in FIGURE, the upper electrode 4 is formed as a thin film on the surface of the dielectric film 5. The upper electrode 4 is an electrode for sandwiching the dielectric film 5 with the lower electrode 3 mentioned above and functioning as a capacitor. Thus, the polarity of the upper electrode 4 is different from that of the lower electrode 3.

As with the lower electrode 3, the upper electrode 4 is composed of any conductive material, such as metals (e.g., Pt, Ru, Rh, Pd, Ir, Au, Ag, Cu), their alloys, and conductive oxides.

2. Method of Manufacturing Thin Film Capacitor

Next, explained below is a method of manufacturing the thin film capacitor 10 shown in FIGURE.

The substrate 1 is initially prepared. When the substrate 1 is a Si single crystal substrate, an insulation layer is formed on a main surface of the substrate. The insulation layer is formed by a known film formation method, such as thermal oxidation method and chemical vapor deposition (CVD).

Then, the foundation layer 2 is formed by forming a thin film of a material constituting the foundation layer on the formed insulation layer by a known film formation method.

After the foundation layer 2 is formed, the lower electrode 3 is formed by forming a thin film of a material constituting the lower electrode by a known film formation method.

Then, the dielectric film 5 is formed on the lower electrode 3. In the present embodiment, the dielectric film 5 is formed as a deposited film where a material constituting the dielectric film 5 is deposited as a thin film on the lower electrode 3 by a known film formation method.

For example, the known film formation method is vacuum deposition, sputtering, pulsed laser deposition (PLD), metal organic chemical vapor deposition (MO-CVD), metal organic decomposition (MOD), sol-gel process, chemical solution deposition (CSD), or the like. Incidentally, the raw materials used for the film formation (vacuum deposition materials, various target materials, organic metal materials, etc.) may contain trace impurities, sub-components, etc., but there is no problem as long as predetermined dielectric characteristics are obtained.

For example, when PLD method is used, the dielectric thin film 5 is formed on the lower electrode 3 using a target having a desired composition. In the present embodiment, the film formation conditions are preferably as follows. Preferably, oxygen pressure is 0.1-10 Pa. Preferably, the film formation is carried out at room temperature. Preferably, laser power is 3-5 $J/cm^2$. Preferably, pulse frequency is 1-20 Hz.

In the present embodiment, the dielectric film is formed and thereafter subjected to rapid thermal anneal (RTA). In the present embodiment, RTA is preferably carried out in oxygen atmosphere at a heating rate of 1000° C./min or more for 1-30 minutes at a temperature of 300° C. or more and 750° C. or less.

Next, the upper electrode 4 is formed on the formed dielectric film 5 by forming a thin film of a material constituting the upper electrode using a known film formation method.

Through the above steps, obtained is a thin film capacitor 10 where the capacitor part (the lower electrode 3, the dielectric film 5, and the upper electrode 4) is formed on the substrate 1 as shown in FIGURE. Incidentally, the protection film for protecting the dielectric film 5 is formed by a known film formation method so as to cover at least a portion where the dielectric film 5 is exposed to the outside.

3. Summary of Present Embodiment

The present embodiment focuses on a Bi—Zn—Nb—O based oxide. The Bi—Zn—Nb—O based oxide is a complex oxide represented by a general formula of $A_2B_2O_7$. In this complex oxide, Zn can occupy both the A site and the B site, and two types of polyhedrons are formed. The present inventors have found that increasing the proportion of two types of polyhedrons stabilizes the structure of the Bi—Zn—Nb—O based oxide and generates less structural change by temperature change. In the present embodiment, temperature coefficient of capacitance Tcc is thereby favorable by controlling the Zn content ratio of the Bi—Zn—Nb—O based oxide within the above-mentioned range.

The present inventors have also found that controlling the Bi content ratio of the A site and the Bi content ratio to the Nb content ratio of the B site reduces vacancies in the Bi—Zn—Nb—O based oxide and consequently improves quality factor (Q factor) and high temperature accelerated life. In the present embodiment, a high quality factor (Q factor) and a favorable high temperature accelerated life are obtained by controlling the above-mentioned proportions within the above-mentioned ranges.

Specifically, the above-mentioned first dielectric composition can exhibit a high quality factor (Q factor) of 1000 or more even in a high frequency band of 2 GHz or more and can also control an absolute value of temperature coefficient of capacitance Tcc to 50 ppm/° C. or less and an insulation resistance (IR) lifetime at 180° C. to 15.0 h or more.

The present inventors have also found that quality factor (Q factor), relative permittivity εr, and high temperature accelerated life are improved by controlling the Nb content ratio of the B site and the Bi content ratio of the A site to the Nb content ratio. In the present embodiment, a high relative permittivity εr, a high quality factor (Q factor), and a favorable high temperature accelerated life are obtained by controlling the above-mentioned proportions within the above-mentioned ranges.

Specifically, the above-mentioned second dielectric composition can exhibit a high relative permittivity εr of 100 or more and a high quality factor (Q factor) of 1000 or more even in a high frequency band of 2 GHz or more and can also control an absolute value of temperature coefficient of capacitance Tcc to 50 ppm/° C. or less and an insulation resistance (IR) lifetime at 180° C. to 15.0 h or more.

4. Modifications

The above-mentioned embodiment is explained with the dielectric layer composed of only the dielectric composition according to the present embodiment, but it is permissible to employ an electronic component having a multilayer structure combining a dielectric film composed of the dielectric composition according to the present embodiment and a film composed of another dielectric composition. For example, when the multilayer structure is formed with an existing amorphous dielectric film of $Si_3N_x$, $SiO_x$, $Al_2O_x$, $ZrO_x$, $Ta_2O_x$, etc. or a crystalline film, it is possible to adjust temperature change in impedance and relative permittivity of the dielectric film 5.

It is also permissible to employ a multilayer capacitor including a plurality of dielectric films composed of the dielectric composition according to the present embodiment.

In the above-mentioned embodiment, the foundation layer is formed for improvement in the adhesion between the substrate and the lower electrode. However, no foundation layer may be formed if the adhesion between the substrate and the lower electrode can sufficiently be maintained. When the substrate is composed of metals that can be used as electrodes (e.g., Cu, Pt), their alloys, oxide conductive materials, or the like, neither foundation layer nor lower electrode may be formed.

In the above-mentioned embodiment, the dielectric layer is a dielectric deposited film formed by a known film formation method. However, the dielectric layer may be composed of a sintered body obtained by firing a green compact of a raw material powder of the dielectric composition.

The electronic component including the dielectric layer composed of the sintered body may be a single-layer capacitor whose dielectric layer is a single layer or a multilayer capacitor where multiple dielectric layers are laminated.

The single-layer capacitor has a structure where electrodes are formed on opposing surfaces of the dielectric composition. The multilayer capacitor has a laminated body structured by alternately laminating multiple dielectric layers composed of the dielectric composition and internal electrode layers. A pair of terminal electrodes respectively conducted with the internal electrode layers is formed on both ends of the laminated body.

Hereinbefore, an embodiment of the present invention is explained, but the present invention is not limited to the above-mentioned embodiment and may variously be changed within the scope of the present invention.

EXAMPLES

Hereinafter, the present invention is explained in further detail with examples and comparative examples, but the present invention is not limited to the following examples.

Experimental Example 1

First of all, a necessary target for forming a dielectric film was manufactured as below.

As raw material powders for manufacturing the target, powders of $Bi_2O_3$, ZnO, and $Nb_2O_5$ were prepared. These powders were weighed so as to have the final compositions of the samples of Examples 1-9 and Comparative Examples 1-6 shown in Table 1. The weighed raw material powders, water, and $ZrO_2$ beads (φ2 mm) were put into a polypropylene wide-mouth pot (volume: 1 L) and mixed in wet manner for 20 hours. After that, the mixed powder slurry was dried at 100° C. for 20 hours, and the obtained mixed powder was put into an $Al_2O_3$ crucible and calcined with firing conditions (five-hour holding at 800° C. in the air). Then, a calcined powder was obtained.

The obtained calcined powder was put into a mortar, and a polyvinyl alcohol (PVA) aqueous solution (concentration: 6 wt %) was added as a binder so that the solution would be 4 wt % to the calcined powder. Then, a granulated powder was prepared using a pestle. This prepared granulated powder was put into a die (φ20 mm) so as to have a thickness of about 5 mm and pressed using a uniaxial press machine to obtain a green compact. As the press conditions, the pressure was $2.0 \times 10^8$ Pa, and the temperature was room temperature.

After that, the obtained green compact was debindered at 100° C./hour (heating rate) and 400° C. (holding temperature) for four hours (temperature holding time) in the atmospheric pressure. The debindered green compact was subsequently fired at 200° C./hour (heating rate) and 1000° C.-1200° C. (holding temperature) for 12 hours (temperature holding time) in the atmospheric pressure. Then, a sintered body was obtained.

Both surfaces of the obtained sintered body were polished by a cylindrical grinding machine so that the thickness would be 4 mm. Then, a target for forming the dielectric film was obtained.

After that, prepared was a substrate (10 mm×10 mm square) where an insulation layer of $SiO_2$ was formed on a Si single crystal substrate (thickness: 350 μm). A Ti thin film (foundation layer) was formed by sputtering on the surface of the substrate so that the thickness of the Ti thin film would be 20 nm.

Next, a Pt thin film (lower electrode) was formed by sputtering on the Ti thin film so that the thickness of the Pt thin film would be 4 μm.

A dielectric film was formed on the Ti and Pt thin films. In the present examples, the dielectric film was formed on the lower electrode by PLD method using the above-prepared target so that the thickness of the dielectric film would be 400 nm. As the film formation conditions by PLD method, the oxygen pressure was 1 Pa, the laser power was 3 $J/cm^2$, the laser pulse frequency was 10 Hz, and the film formation temperature was room temperature. To partially expose the lower electrode, a metal mask was used for forming a region where the dielectric film was not formed. After the dielectric film was formed, the dielectric film was subjected to a rapid thermal annealing (RTA) where temperature was increased at 1000° C./min (heating rate) and held at 550° C. for one minute in oxygen atmosphere.

Next, an Ag thin film (upper electrode) was formed on the obtained dielectric film using a vapor deposition device. The upper electrode was formed so that the diameter would be 100 μm and the thickness would be 100 nm using a metal mask. Then, obtained were samples of thin film capacitors having the structure shown in FIGURE (Examples 1-9 and Comparative Examples 1-6).

Incidentally, the composition of the dielectric film of all samples was analyzed at room temperature using a wavelength dispersive X-ray fluorescence (WD-XRF) elemental analyzer (ZSX-100e manufactured by Rigaku Corporation) and was confirmed to have the composition described in Table 1. The thickness of the dielectric film was a value measured by processing the thin film capacitor with FIB and observing the obtained cross section with scanning electron microscope (SEM).

All of the obtained thin film capacitor samples were measured for relative permittivity εr, Q factor, temperature coefficient of capacitance Tcc, and high temperature accelerated life in the following manner.

(Q Factor and Relative Permittivity)

Q factor and relative permittivity of the thin film capacitor samples were calculated from the above-obtained thickness of the dielectric film and a capacitance measured at 25° C. (reference temperature) with an RF impedance/material analyzer (4991A manufactured by Agilent) at 2 GHz (frequency) and 0.5 Vrms (input signal level; measurement voltage). In the present examples, Q factor was preferably higher, and a sample having a Q factor of 1000 or more was determined to be favorable. In the present examples, a relative permittivity of 50 or more and less than 80 was determined to be favorable. The results are shown in Table 1.

(Temperature Coefficient of Capacitance (Tcc))

Except for measuring capacitance while measurement temperature was changed every 25° C. from −55° C. to 125° C. using a constant temperature bath, capacitance at measurement temperature was measured as above, and a temperature coefficient of capacitance was calculated as a rate (unit: ppm/° C.) of change with respect to the capacitance at 25° C. (reference temperature). Preferably, temperature coefficient of capacitance was smaller. A sample whose absolute value of temperature coefficient of capacitance (|Tcc|) was 50 ppm/° C. or less was determined to be favorable. The results are shown in Table 1.

(High Temperature Accelerated Life)

Insulation resistance lifetime was measured as high temperature accelerated life. DC voltage (16 V/μm) was applied to the above-obtained dielectric film at 180° C., and a change with time of insulation resistance before the application of DC voltage was measured. A duration where the insulation resistance of the dielectric film becomes $10^5 \Omega$ or less was defined as a lifetime. The lifetime was measured for 20 samples, and this average was defined as an insulation resistance (IR) lifetime. Preferably, the IR lifetime is longer. A sample having an IR lifetime of 15.0 h or more was determined to be favorable. The results are shown in Table 1.

TABLE 1

| | Composition $Bi_xZn_yNb_zO_{1.75+\delta}$ | | | | Electrical Characteristics | | | |
|---|---|---|---|---|---|---|---|---|
| | x | y | z | x/z | εr at 2 GHz | Q at 2 GHz | Tcc (ppm/° C.) | IR Lifetime (h) |
| Ex. 1 | 0.16 | 0.20 | 0.64 | 0.25 | 68 | 1130 | 13 | 18.6 |
| Ex. 2 | 0.20 | 0.20 | 0.60 | 0.33 | 70 | 1200 | 25 | 15.0 |
| Ex. 3 | 0.15 | 0.25 | 0.60 | 0.26 | 50 | 1600 | 9 | 19.5 |
| Ex. 4 | 0.20 | 0.25 | 0.55 | 0.35 | 61 | 1300 | −22 | 15.2 |
| Ex. 5 | 0.19 | 0.40 | 0.41 | 0.47 | 74 | 1150 | −21 | 15.4 |
| Ex. 6 | 0.12 | 0.40 | 0.48 | 0.26 | 71 | 1220 | 12 | 24.1 |
| Ex. 7 | 0.16 | 0.40 | 0.44 | 0.35 | 50 | 1035 | 41 | 19.2 |

TABLE 1-continued

| | Composition $Bi_xZn_yNb_zO_{1.75+\delta}$ | | | | Electrical Characteristics | | | |
|---|---|---|---|---|---|---|---|---|
| | x | y | z | x/z | εr at 2 GHz | Q at 2 GHz | Tcc (ppm/° C.) | IR Lifetime (h) |
| Ex. 8 | 0.10 | 0.50 | 0.40 | 0.26 | 57 | 1260 | 16 | 28.6 |
| Ex. 9 | 0.20 | 0.50 | 0.30 | 0.65 | 60 | 1290 | 9 | 15.1 |
| Comp. Ex. 1 | 0.15 | 0.20 | 0.65 | *0.19* | 60 | *376* | *-410* | 20.1 |
| Comp. Ex. 2 | *0.21* | 0.20 | 0.59 | 0.35 | 74 | 1330 | *-106* | *14.7* |
| Comp. Ex. 3 | *0.21* | 0.40 | 0.39 | 0.50 | *81* | *340* | 2 | *14.8* |
| Comp. Ex. 4 | 0.12 | 0.40 | 0.48 | *0.24* | *48* | 1520 | *133* | 25.4 |
| Comp. Ex. 5 | 0.10 | *0.51* | 0.39 | 0.25 | *95* | *470* | -20 | 30.8 |
| Comp. Ex. 6 | 0.20 | *0.51* | 0.29 | 0.70 | *80* | 1400 | -4 | *14.8* |

According to Table 1, it was confirmed that a sample whose relation among "x", "y", and "z" of a complex oxide containing Bi, Zn, and Nb was within the above-mentioned range had a high quality factor (Q factor) (1000 or more), a favorable temperature characteristic (|Tcc|≤50 ppm/° C.), a favorable IR lifetime (15.0 h or more), and a relative permittivity εr falling within a predetermined range in high frequency band (2 GHz).

Experimental Example 2

Except that values of "x", "y", and "z" of a complex oxide containing Bi, Zn, and Nb were set to those shown in Table 2, samples of thin film capacitors (Examples 11-19 and Comparative Examples 11-16) were obtained by forming dielectric films in the same manner as Experimental Example 1. The obtained samples of thin film capacitors were subjected to the same evaluation as Experimental Example 1. The results are shown in Table 2. In terms of evaluation for relative permittivity, a sample having a relative permittivity of 100 or more was determined to be favorable.

TABLE 2

| | Composition $Bi_xZn_yNb_zO_{1.75+\delta}$ | | | | Electrical Characteristics | | | |
|---|---|---|---|---|---|---|---|---|
| | x | y | z | x/z | εr at 2 GHz | Q at 2 GHz | Tcc (ppm/° C.) | IR Lifetime (h) |
| Ex. 11 | 0.60 | 0.20 | 0.20 | 2.93 | 125 | 1040 | 1 | 18.2 |
| Ex. 12 | 0.55 | 0.20 | 0.25 | 2.24 | 136 | 1200 | 0 | 15.0 |
| Ex. 13 | 0.51 | 0.25 | 0.24 | 2.07 | 107 | 1150 | 8 | 15.1 |
| Ex. 14 | 0.56 | 0.25 | 0.19 | 2.98 | 113 | 1099 | 39 | 19.6 |
| Ex. 15 | 0.37 | 0.40 | 0.23 | 1.61 | 125 | 1020 | 7 | 16.1 |
| Ex. 16 | 0.45 | 0.40 | 0.15 | 2.97 | 164 | 1230 | -21 | 24.5 |
| Ex. 17 | 0.42 | 0.40 | 0.18 | 2.38 | 122 | 1568 | -34 | 20.8 |
| Ex. 18 | 0.37 | 0.50 | 0.13 | 2.94 | 119 | 1290 | -8 | 29.2 |
| Ex. 19 | 0.31 | 0.50 | 0.19 | 1.59 | 107 | 1160 | 14 | 10.1 |
| Comp. Ex. 11 | 0.54 | 0.20 | *0.26* | 2.04 | 150 | *70* | *84* | *14.0* |
| Comp. Ex. 12 | 0.61 | 0.20 | 0.19 | *3.26* | *89* | *240* | *925* | 19.7 |
| Comp. Ex. 13 | 0.44 | 0.30 | *0.26* | 1.70 | 107 | *188* | *93* | *14.2* |
| Comp. Ex. 14 | 0.38 | *0.51* | 0.11 | *3.50* | *70* | *210* | *416* | 34.0 |
| Comp. Ex. 15 | 0.29 | *0.51* | 0.20 | 1.39 | *53* | *590* | *141* | 18.1 |
| Comp. Ex. 16 | 0.46 | 0.25 | *0.29* | 1.60 | 136 | *550* | -26 | *12.8* |

According to Table 2, it was confirmed that a sample whose relation among "x", "y", and "z" of a complex oxide containing Bi, Zn, and Nb was within the above-mentioned range had a high relative permittivity εr (100 or more), a high quality factor (Q factor) (1000 or more), a favorable temperature characteristic (|Tcc|≤50 ppm/° C.), and a favorable IR lifetime (15.0 h or more) in high frequency band (2 GHz).

INDUSTRIAL APPLICABILITY

The present invention can obtain a dielectric composition having a high Q factor in high frequency band, a small temperature coefficient of capacitance in a predetermined temperature range, and a favorable high temperature accelerated life. Such a dielectric composition is favorable as a dielectric film with a thin film shape and is favorable for electronic components for high frequency, such as baluns, couplers, filters, and duplexers and diplexers combining filters.

DESCRIPTION OF THE REFERENCE NUMERICAL

10 . . . thin film capacitor
1 . . . substrate
2 . . . foundation layer
3 . . . lower electrode
4 . . . upper electrode
5 . . . dielectric film

What is claimed is:

1. A dielectric composition comprising a complex oxide containing bismuth, zinc, and niobium, wherein
   x+y+z=1.00,
   x<0.20,
   0.20≤y≤0.50, and
   0.25≤x/z,
   in which the complex oxide is represented by a composition formula of $Bi_xZn_yNb_zO_{1.75+\delta}$.

2. A dielectric composition comprising a complex oxide containing bismuth, zinc, and niobium, wherein
$x+y+z=1.00$,
$0.20 \leq y \leq 0.50$,
$1.5 < x/z \leq 3.0$, and
$z < 0.25$,
in which the complex oxide is represented by a composition formula of $Bi_xZn_yNb_zO_{1.75+\delta}$.

3. An electronic component comprising a dielectric layer containing the dielectric composition according to claim 1.

4. An electronic component comprising a dielectric layer containing the dielectric composition according to claim 2.

5. A dielectric composition comprising a complex oxide containing bismuth, zinc, and niobium, wherein
$x+y+z=1.00$,
$x<0.20$,
$0.20 \leq y \leq 0.50$, and
$0.25 \leq x/z$,
in which the complex oxide is represented by a composition formula of $Bi_xZn_yNb_zO_{1.75+\delta}$, and wherein the complex oxide contains a pyrochlore phase.

6. A dielectric composition comprising a complex oxide containing bismuth, zinc, and niobium, wherein
$x+y+z=1.00$,
$0.20 \leq y \leq 0.50$,
$1.5 < x/z \leq 3.0$, and
$z < 0.25$,
in which the complex oxide is represented by a composition formula of $Bi_xZn_yNb_zO_{1.75+\delta}$, and wherein the complex oxide contains a pyrochlore phase.

* * * * *